Figure 1:
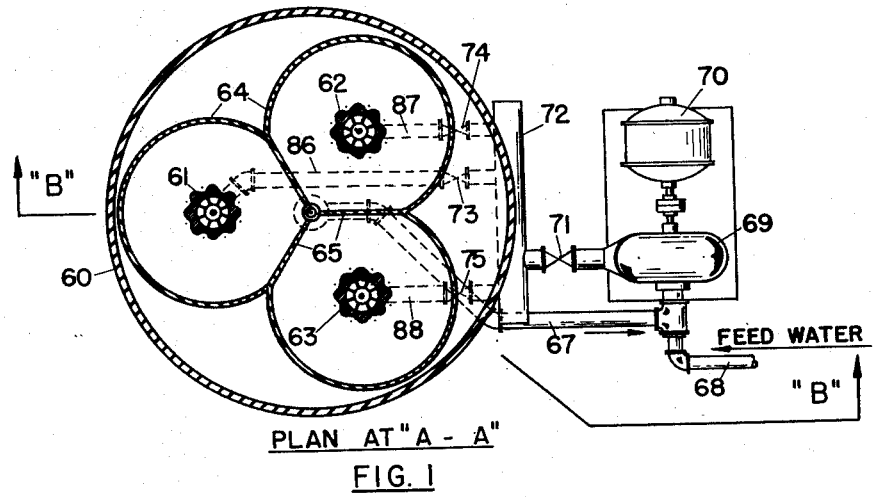

April 20, 1954

M. EATON 2,676,240

ELECTRIC BOILER

Filed Aug. 3, 1953

2 Sheets-Sheet 1

PLAN AT "A - A"

SECTION AT "B - B"

M. EATON.
INVENTOR.
BY D.R. Morrison
AGENT.

SEC. "C-C"

SEC. "A-A"

SEC. "B-B"

Patented Apr. 20, 1954

2,676,240

UNITED STATES PATENT OFFICE 2,676,240

ELECTRIC BOILER

Milton Eaton, Shawinigan Falls, Quebec, Canada, assignor to The Shawinigan Water and Power Company, Montreal, Quebec, Canada, a corporation of Quebec Application August 3, 1953, Serial No. 371,870

4 Claims. (Cl. 219—40)

This invention relates to improvements in electric steam generators of the electrode type, and in particular to those in which the electrodes are normally partially submerged in the boiler water, the load is regulated by raising or lowering the water level between points on the electrodes and below the tips of the electrodes, and in which means is provided to spout boiler water up under each electrode.

Electric steam generators, or more briefly electric boilers, of this type are fully described in applicant's earlier U. S. Patent No. 2,611,852, issued September 23, 1952. In accordance with that invention, the objects set out in the specification are obtained by the use of apparatus which takes water from the bottom of a boiler of the type referred to, optionally mixes feed water with it, and spouts the water up under the electrodes with sufficient volume and velocity to cover the tips of the electrodes and to climb part way up their sides, provision being made to control the electrical power input to the boiler by varying the water level between levels below the electrodes and near their upper ends.

It has been found in the application of the invention that under certain conditions the performance is not entirely satisfactory. For example, when the water level is high on the electrodes the spouts of water tend to cause the boiler water to oscillate with the spouted water being carried on and off the electrodes thus causing unstable operation. It is further apparent in practice that, when the diameter of the electrodes is small compared with that of the boiler, means must be provided not only to prevent steam accumulation on the electrode surfaces but also to provide comparatively steam-free paths through the water near the electrodes where the steam tends to be concentrated.

It is an object of this invention to provide a boiler of the type referred to in which the tendency of the spouts of water to cause oscillations of the boiler water is eliminated. It is a further object of this invention to provide means for obtaining comparatively steam-free paths for the electric current through the water near the electrodes where the steam tends to be concentrated.

These and other objects are obtained according to the present invention by directing the spouted water up into hollow electrodes through terminal openings therein and out through suitable openings arranged around their sides. This requires the use of hollow electrodes with lateral and terminal openings for the passage therethrough of water discharged from the water spouts.

Figure 2:
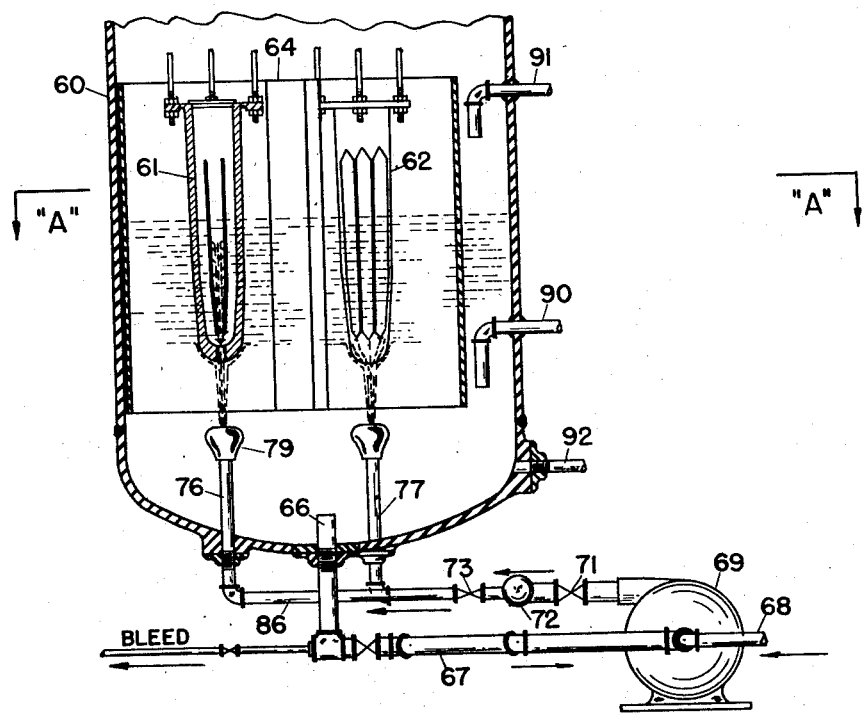
Figure 7:
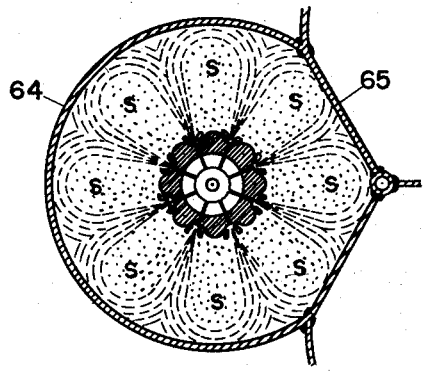
Figure 3:
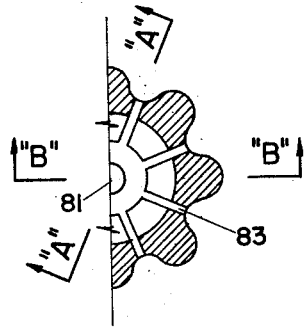
Figure 4:
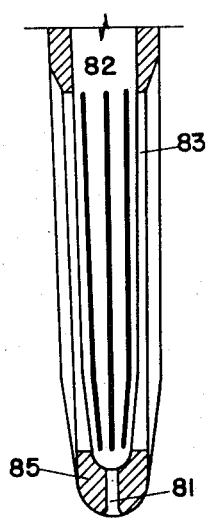
Figure 6:
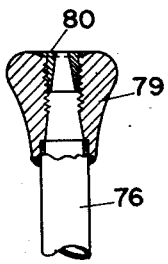
Figure 5:
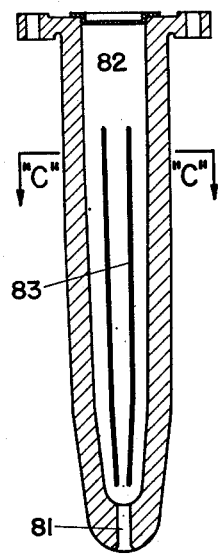

The invention will be easily understood from the following description thereof, references being made to the accompanying drawings in which Figures 1 and 2 are sectional views showing some of the essential elements of a 3-phase electric boiler constructed according to this invention, Figures 3, 4, and 5 are sectional views of electrodes designed to function as part of the invention, Figure 6 shows details of water spouts with nozzles constituting parts of the invention, and Figure 7 is a sectional plan view indicating the flow of water and steam in an electric boiler to which the present invention is applied.

Figures 1 and 2 show part of a conventional electric boiler shell 60, having a steam outlet (not shown), with electrodes 61, 62, and 63 mounted therein. As illustrated in the drawings, preferred electrodes have hollow centers 82 and solid tips 85 through which holes 81 are drilled. The outer surfaces are corrugated longitudinally with slots 83 cut at the centers of the grooves which extend from the solid tips 85 to points near the upper limit of water level.

The water spouts 76, 77, and 78 (78 not being shown), located directly under, and pointing upwards towards the electrode tips, as indicated in Figure 2, are optionally terminated by nozzles 79 shown in greater detail by Figure 6. Bushings 80, with tapered openings through their centers, determine the diameter of the spouts of water which preferably corresponds with the size of the holes 81 in the electrode tips.

The intake of pump 69 is connected with the bottom of the boiler by pipes 66 and 67. The pump discharge is connected with a distributor or manifold 72 by means of piping in which valve 71 is located. The water spouts 76, 77, and 78 are connected with the manifold 72 by pipes 86, 87 and 88 in which valves 73, 74 and 75 are installed.

The boiler feed water pipe 68 may be connected at any one of various points, e. g., directly with manifold 72, but it is preferably terminated at the intake side of pump 69, substantially as shown in Figure 1. With this point of connection the feed water lowers the temperature of the circulated boiler water before it enters the pump thus preventing the formation of flash steam which is otherwise produced by drop in suction pressure and thereby improving the performance of the pump.

Although it is not necessary that the electrodes, 61, 62 and 63 should be enclosed by a ground shell having a separate enclosure for each electrode, this arrangement is preferred. The ground shell 64, Figure 1, is divided into three segments by baffle 65. The ground shell and/or the baffle may be provided with holes or slots to permit limited circulation of boiler water through them.

Pipes 90, 91 and 92, Figure 2, are associated with automatic control apparatus, for example, that described in U. S. Patents 2,453,210 and 2,453,211. The elevations of the boiler ends of pipes 90 and 91 determine respectively the lower and upper limits of water level. The lower limit may be at any level between the tops of the water spouts and the tips of the electrodes.

The pump 69, driven by motor 70, takes water from the bottom of the boiler 60 which it pumps under pressure to manifold 72 and through the water spouts 76, 77 and 78. The velocity of the spouted water is adjusted by means of valve 71 so that the water enters the electrodes through holes 81 in their tips and passes out into the boiler water through the vertical slots 83 symmetrically arranged around the sides of the electrodes. The size and shape of the nozzle orifices 80 are made so that the spouts of water at the level of the electrode tips are a little larger than holes 81. As a result of these relative dimensions some water spills over the outside of the electrode tips 85. This is desirable in order to prevent an arc being formed when the water level is lowered below the electrodes on light load operation, and also to prohibit steam accumulation on the outside of the electrode tips. Valves 73, 74 and 75 may be used for adjusting the relative rates of discharge through the water spouts; however, this is normally accomplished by the water spout nozzles and therefore these valves serve for occasional emergency or adjustment use.

The boiler feed water lowers the temperature of the spouted water thus making it more effective in preventing steam accumulation around the electrodes.

Water discharged through the electrode slots creates currents in the boiler water and steam distribution as indicated by the sectional plan view, Figure 7. The streams of water (below steam temperature) discharged through the electrode slots penetrate the boiler water forming steam-free paths to which the electric current tends to be confined. The generated steam rises through the intervening spaces "S."

The longitudinal corrugations on the outer surfaces of the electrodes are designed to accommodate the slotted openings and to increase the surface area thus increasing the current-carrying capacity of electrodes of a given mean diameter. The outer rims of the corrugations are not washed by water discharged through the slots. Arcing does not result, however, because the resistance imposed by steam on these surfaces only deflects the electric current into the adjacent grooves.

A number of advantages result from the use of the various elements of the invention as described above:

(1) The spouted water is guided to such an extent that the spouts of water do not cause the boiler water to oscillate. (2) The spouted water (below steam temperature) discharged from the electrode slots penetrates the zone around the electrodes, in which the steam tends to be concentrated, thus forming steam-free paths for the electric current and causing the generated steam to rise through well-defined intervening spaces; much higher average current density on the electrodes than that of conventional boilers is therefore permissible and the steam is released with minimum disturbance to the electrical resistance of the boiler water. (3) The steam is used to greater advantage as a means for increasing the electrical resistance of the boiler water and for this reason electric boilers of moderate capacities may be designed for operation at much higher voltages.

I claim:

1. An electric boiler comprising (1) a pressure vessel (2) a feed water inlet (3) a steam outlet, (4) at least one hollow electrode with lateral and terminal openings for the passage therethrough of water, said electrodes being insulated from the pressure vessel and normally being at least partially submerged in the boiler water, (5) means to regulate the load by changing the water level on the electrodes (6) water communication means fixing the lower limit of the water level below the tips of the electrodes, and (7) pumping means to spout boiler water up under each electrode with sufficient volume and velocity to enter the terminal openings of the electrodes and flow out through the lateral openings.

2. An electric boiler as claimed in claim 1, including means for directing the water from the feed water supply into the spouted water.

3. An electric boiler as claimed in claim 2, including in combination a grounded metal shell surrounding the electrodes and having a separate enclosure for each electrode.

4. An electric boiler as claimed in claim 3 in which the grounded metal shell is provided with openings to permit limited circulation of boiler water therethrough.

No references cited.